United States Patent
Guignard et al.

(10) Patent No.: US 9,057,777 B2
(45) Date of Patent: Jun. 16, 2015

(54) DEVICE FOR DETECTING EVENTS

(75) Inventors: Thierry Guignard, Cholet (FR);
Sébastien Lestieux, Cholet (FR)

(73) Assignee: THALES, Courbevoie (FR)

( * ) Notice: Subject to any disclaimer, the term of this patent is extended or adjusted under 35 U.S.C. 154(b) by 49 days.

(21) Appl. No.: 13/992,701

(22) PCT Filed: Dec. 9, 2011

(86) PCT No.: PCT/EP2011/072383
§ 371 (c)(1),
(2), (4) Date: Dec. 20, 2013

(87) PCT Pub. No.: WO2012/076711
PCT Pub. Date: Jun. 14, 2012

(65) Prior Publication Data
US 2014/0321243 A1   Oct. 30, 2014

(30) Foreign Application Priority Data
Dec. 10, 2010 (FR) ..................................... 10 04819

(51) Int. Cl.
*G01S 3/802* (2006.01)
(52) U.S. Cl.
CPC ....................... *G01S 3/802* (2013.01)
(58) Field of Classification Search
CPC ...................................... G01S 3/802
USPC ........................................... 367/128
See application file for complete search history.

(56) References Cited

U.S. PATENT DOCUMENTS

| | | | |
|---|---|---|---|
| 3,699,509 A * | 10/1972 | Hirschberg | .................. 367/128 |
| 5,970,024 A | 10/1999 | Smith | |
| 6,621,764 B1 | 9/2003 | Smith | |
| 7,409,899 B1 | 8/2008 | Beckman | |
| 2006/0206268 A1 * | 9/2006 | Kahkoska | ........................ 702/4 |
| 2010/0117896 A1 | 5/2010 | Chu | |

FOREIGN PATENT DOCUMENTS

WO   WO2012076711   *   6/2012   ............. G01S 3/802

* cited by examiner

*Primary Examiner* — Daniel Pihulic
(74) *Attorney, Agent, or Firm* — Baker & Hostetler LLP

(57) ABSTRACT

A multi-sensor device for detecting events, comprises first acquisition means comprising at least a first sensor, operating in a first frequency band and second acquisition means comprising at least a second sensor, operating in a second frequency band different from the first frequency band, means for processing raw data originating from the acquisition means and comprising means for the detection of events in the raw data and for determining the geographic location of said events, means for transmitting an alert if an event is detected by the processing means, means for storing the raw data, said storage means being suitable for restoring the stored raw data in a synchronized manner, and monitoring means which, following detection of an event in the raw data of one of said acquisition means, enables said processing means to be adapted to detect events in said stored raw data originating from said other acquisition means.

12 Claims, 4 Drawing Sheets

DEVICE FOR DETECTING EVENTS

CROSS-REFERENCE TO RELATED APPLICATIONS

This application is a National Stage of International patent application PCT/EP2011/072383, filed on Dec. 9, 2011, which claims priority to foreign French patent application No. FR 1004819, filed on Dec. 10, 2010, the disclosures of which are incorporated by reference in their entirety.

FIELD OF THE INVENTION

The invention relates to multi-sensor detection and direction-finding systems, suitable for detecting electromagnetic, sound or light radiation, and more particularly their integration onto mobile platforms.

BACKGROUND

Electromagnetic, sound or light radiation detection systems comprising a plurality of independent sensors are already known. The integration of systems of this type onto mobile platforms requires the management of a substantial number of mechanical, electrical or software interfaces.

Each of the radiations which are of interest requires a dedicated sensor to perform a detection: a camera for light radiation, microphones for sound radiation or antennas for electromagnetic radiation. The use of independent sensors involves a disadvantageous volume and weight in connection with an integration onto a mobile platform such as a vehicle. All of these independent sensors also increase the overall cost of the platform.

The diversity of the systems renders the integration of different products onto the same vehicle particularly complicated, due to either lack of space or compatibility problems.

The use of independent sensors requires a fusion of the information from integrated (summary) information supplied by the sensors. This bottom-up approach does not allow the extraction algorithms of each sensor to interact in order to possibly modify their behavior according to the current activity.

SUMMARY OF THE INVENTION

The present invention aims notably to overcome these problems by proposing an event detection device integrating all of these sensors within the same device and simplifying its integration onto a mobile platform.

For this purpose, the subject matter of the invention is a multi-sensor device for detecting events, comprising
  first acquisition means comprising at least a first sensor, operating in a first frequency band, and second acquisition means comprising at least a second sensor, operating in a second frequency band different from the first frequency band,
  means for processing raw data originating from the acquisition means, and comprising means for detecting events in the raw data and for determining the geographic location of said events,
  means for transmitting an alert if an event is detected by the processing means,
characterized in that it furthermore comprises means for storing the raw data, said storage means being suitable for restoring the stored raw data in a synchronized manner, and monitoring means which, following the detection of an event in the raw data of one of said acquisition means, enables said processing means to be adapted to detect events in said stored raw data originating from said other acquisition means.

The invention has the advantage of simplifying the implementation of a system integrating sensors operating on different frequency bands. The invention provides substantial frequency coverage with a single detection device. The prior art makes use of independent sensors. It is not therefore possible to rationalize the building blocks of the system, each of the blocks being developed independently for each of the systems. The invention enables the use of a single processing unit common to all of the sensors and elements complementary to the device: orientation of the sensor (compass), positioning (GPS) and above all synchronization between sensors (time reference). The invention also enables a substantial reduction in the costs for integrating a multi-sensor system onto a platform.

According to one characteristic of the invention, said processing means comprise improved detection means suitable for increasing the number of buffer memory zones for temporary storage of samples of said stored raw data.

This provides greater sensitivity and increases the efficiency and reliability of the detection (more effective protection against detection errors), while maintaining good temporal precision for time-stamping the events, and this can be implemented, for example, by increasing the number of buffer zones used to perform the different processing operations.

According to one characteristic of the invention, said monitoring means are adapted on the basis of the detection of an event in a time interval to parameterize said processing means in order to implement the detection on the basis of the stored raw data originating from said other acquisition means in said same time interval.

This technical characteristic reduces the detection time by focusing the algorithm on the time interval where an event has already been detected.

According to one characteristic of the invention, the multi-sensor detection device furthermore comprises means for determining an orientation of said device, said orientation being transmitted to the processing means.

According to a different characteristic of the invention, the multi-sensor detection device furthermore comprises means for determining a time reference common to the sensors.

The invention has the advantage of pooling different resources for each acquisition means. The following can be mentioned as examples: the power supply, processing means, means for orientation (comprising notably a compass or GPS) and the means for determining a time reference.

According to one characteristic of the invention, the processing means furthermore comprise means for correlating the raw data originating from the acquisition means.

The use of methods fusing the heterogeneous data originating from the different sensors reduces the rate of false alarms in the event detection. The overlap of the information supplied by the different sensors enables its consistency to be checked.

According to the prior art, no fusion of the data produced by each sensor is implemented; and, in the case where a fusion is carried out, it is implemented at a higher level on the basis of summary data produced by the different sensors.

According to one alternative embodiment of the invention, the sensor of one of the at least two acquisition means is a camera.

According to a different alternative embodiment of the invention, the sensor of one of the at least two acquisition means is a seismic detector.

Advantageously, one of the at least two acquisition means is a network comprising a plurality of sensors configured for a direction-finding detection.

Advantageously, the sensors are microphones.

Advantageously, the sensors are antennas.

In one embodiment of the invention, the multi-sensor device for detecting events furthermore comprises means for activating and de-activating the acquisition means, said acquisition means being capable of being activated if an event is detected.

BRIEF DESCRIPTION OF THE DRAWINGS

The invention will be better understood and other advantages will become evident from a reading of the detailed description given by way of a non-limiting example and with the aid of the figures, in which.

DETAILED DESCRIPTION

The invention relates to a multi-sensor device for detecting events. A device of this type can easily be mounted on a mobile vehicle. It can be used in a civilian or military context. In the military context, the events to be detected are the actions of an adversary, for example a rocket firing or telephone calls between attacking forces.

The device comprises at least two acquisition means 101, 102, operating in different frequency bands. The term "different" is understood to mean being able to overlap one another in part or not at all.

In the example described below (FIG. 2), the frequency bands in which the different acquisition means 101, 102 (camera, antennas and microphone) operate do not overlap one another.

Figure 3:
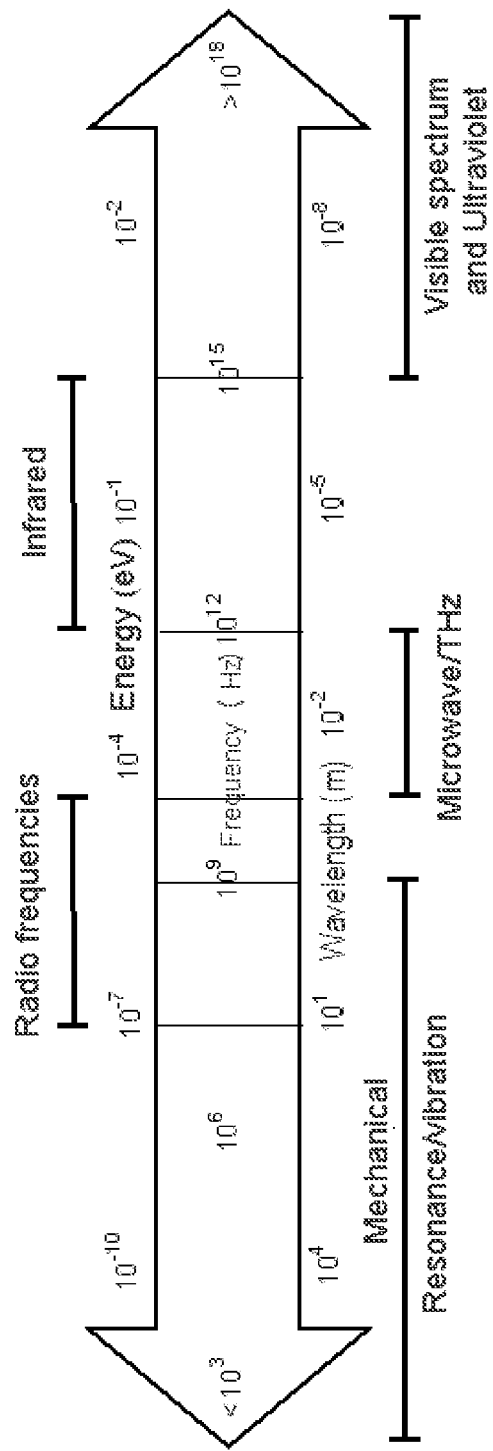
FIG. 3 shows frequency bands which are of interest for a use of a detection device.

FIG. 3 shows frequency bands which are of interest for a use of a detection device:

frequencies above $10^{15}$ Hz: visible spectrum and ultraviolet,
frequencies from $10^{12}$ Hz to $10^{15}$ Hz: infrared,
frequencies from $10^{10}$ Hz to $10^{12}$: microwave,
frequencies from $10^{7}$ Hz to $10^{10}$: radio frequencies,
frequencies below $10^{7}$: mechanical (resonance/vibration).

The sensors are integrated directly into the device. The data originating from the sensors and transmitted to the processing means 103 are raw data, i.e. elementary data not having undergone prior processing (for example a filtering).

The processing means 103 comprise means for detecting 103.1 events in the raw data. The detection enables identification of a particular "pattern" in the data, for example a telephone call in the data originating from the antennas or a gunshot in the data originating from the microphones.

The device comprises means for the transmission 104 of an alert if an event is detected by the processing means. This alert may be visual or audible.

According to one characteristic of the invention, the multi-sensor device for detecting events furthermore comprises means 105 for determining an orientation of said device. This orientation is transmitted to the processing means 103. The means 105 for determining an orientation may comprise, for example, a GPS satellite receiver supplying position information and/or a compass indicating a direction.

According to a different characteristic of the invention, the multi-sensor detection device furthermore comprises means 107 for determining a time reference common to the acquisition means 101, 102. This characteristic can be implemented due to the integration of the sensors within the device. Due to said integration, all of the sensors share a common time reference. This characteristic notably allows the prior data synchronization steps to be avoided during the raw data correlation. These synchronization steps are necessary with the use of the independent sensors (not integrated into the detection device).

According to one characteristic of the invention, the processing means furthermore comprise means for correlating the raw data originating from the acquisition means.

The correlation or fusion is carried out on the basis of raw data, in other words the elementary data of each sensor. Moreover, all of the raw data are sent to detection algorithms in order to increase the probability of detection and reduce the risk of a false alarm.

Figure 1:
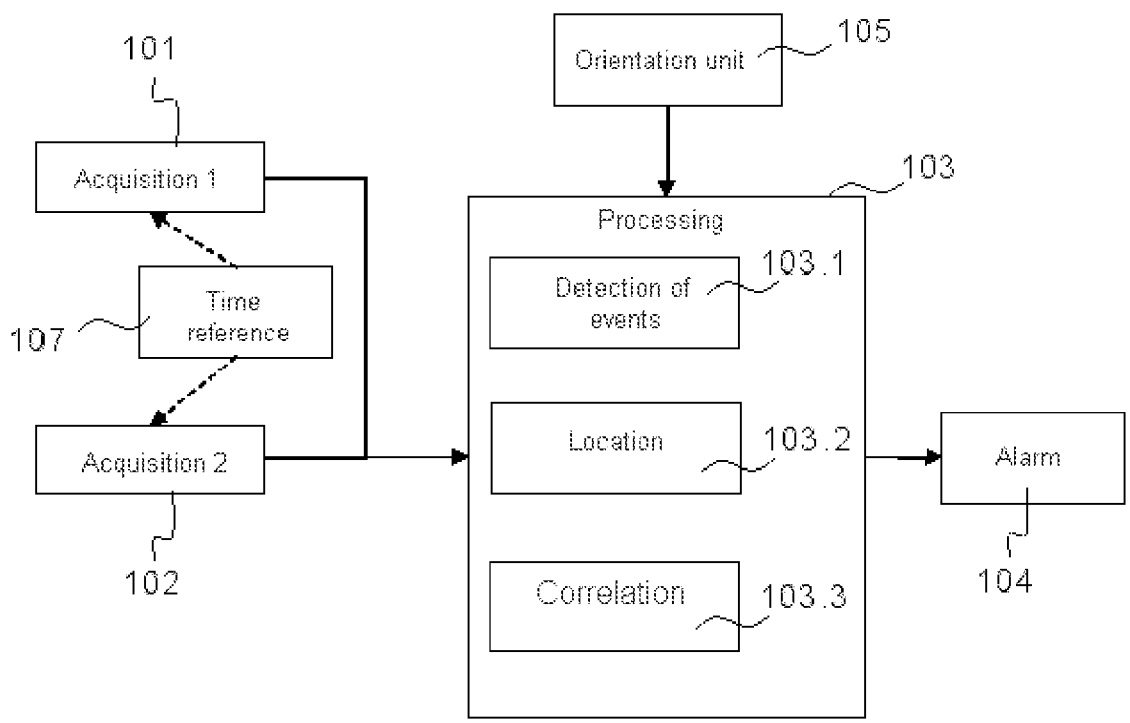
FIG. 1 shows a first example of the device according to the invention.
Figure 2:
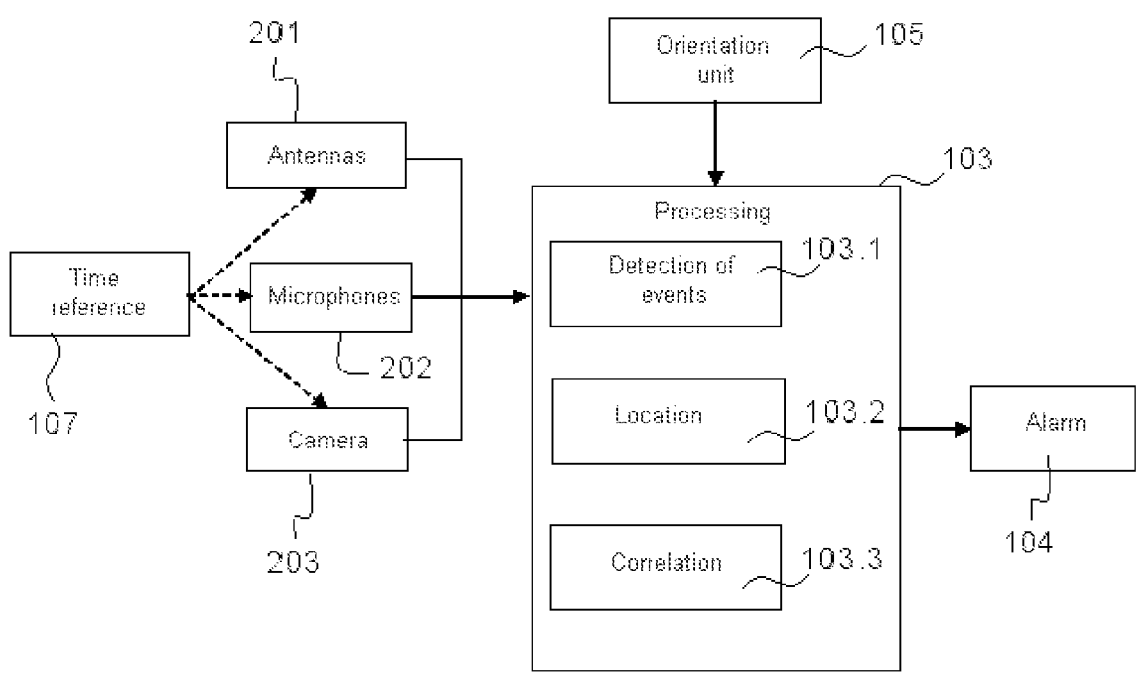
FIG. 2 shows a second example embodiment of a device according to the invention.

FIG. 2 shows a second example embodiment, for example in a military context for multi-band direction finding, of a device according to the invention. The device comprises different acquisition means 201, 202, 203.

The sensor of the first acquisition means is a camera 203 enabling a detection in the visible frequency spectrum, used, for example, to locate the flash of a firearm when it fires.

The second 202 and third 201 acquisition means are sensor networks. The sensors of the second 202 acquisition means are microphones to identify and locate a rocket firing, for example. The sensors of the third 201 acquisition means are antennas for detecting the transmission of a radio wave during a call of an adversary by cellular telephone or PMR (Private Mobile Radio).

On a device of this type, each of the sensor networks is installed in such a way as to minimize interference between sensors. The networks generally comprise at least three sensors to perform the direction-finding function. The processing means comprise means for determining the geographic location of said events which enable, in particular, the processing of the raw data originating from the sensor networks to determine geographic coordinates of the source from which the event originated (a telephone or a radio in the case of a call, a weapon in the case of a firing).

The means for locating 103.3 events are provided within the same processing unit 103, but implement different algorithms for each of the sensor networks, for example (i) the location of a light flash in a video sequence originating from a camera to locate the origin of a firing or (ii) a direction-finding processing applied to data originating from a network of microphones to determine the origin of a gunshot.

Figure 4:
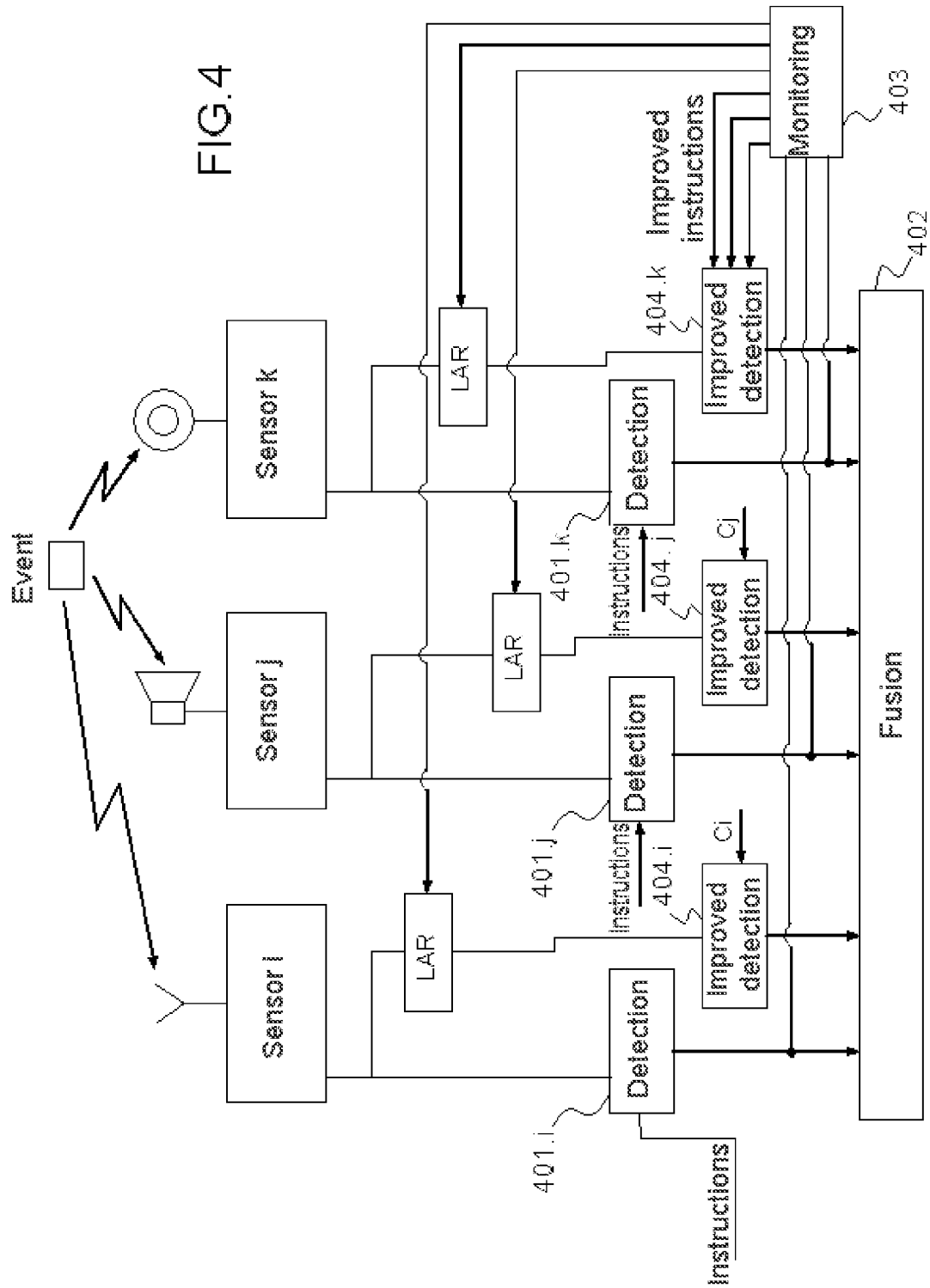
FIG. 4 shows an example embodiment of a detection device according to the invention.

FIG. 4 shows an example embodiment of a detection device. This device comprises three sensors i, j and k. Each of the sensors supplies a stream of raw data. Each of the raw data streams is directed towards the detection means 401.$i$, 401.$j$, 401.$k$ then towards means for fusing the data 402. In this embodiment of the invention, the detection device furthermore comprises a delay line function (LAR) on each raw data stream of each sensor, enabling the raw data to be stored so that they can subsequently be consulted in a synchronized manner.

The storage means (or delay lines) allow a mission to be replayed after it has taken place.

Following a detection result of an algorithm on a given sensor, for example the sensor i, a detection monitoring module 403 instigates an improved detection (404.$i$, 404.$j$, 404.$k$).

This improved detection reruns the detection algorithms on all of the sensors (in the example the sensors i, j and k) on a reduced time window in the past, via the raw data streams present in the delay lines (LAR). The integration parameters used to analyze the activity in the past are then improved with a more substantial integration (on the time signals and/or on the spectra). For example, in the case where the sensor i is a radio direction-finding sensor working on the basis of radio frequency signals, the detection algorithm 401.*i* can use 4 sample buffers at its input (in accordance with the Shannon theorem as a function of the size of the Fast Fourier Transform (FFT) which will be implemented according to the required analysis band). A temporal integration is implemented on 2 pairs of temporal buffers. Two FFTs are then carried out. A spectral integration of the 2 FFTs is then carried out. For the improved detection algorithm 404.*i* in order to improve sensitivity performance and limit detection errors, the number of sample buffers will be increased in relation to the detection algorithm 404.*i*. This is done in order to carry out a greater number of FFTs and then to be able to perform an integration on a greater number of FFTs. It is, for example, possible to carry out an integration on 16 FFTs, the FFTs themselves using an integration of 4 temporal sample buffers at the input.

This increases sensitivity and therefore the efficiency and reliability of the detection (improved protection against detection errors), while maintaining a good temporal precision for time-stamping the events.

The width of the time window and its time delay are to be determined according to the relative propagation time differences of the signals of the different sensors and the mean duration of the signals.

This is useful for understanding the strategy of the attacking force, for example: a first telephone call, followed by a firing, followed by a second telephone call.

The invention claimed is:

1. A multi-sensor device for detecting events, the device comprising:
    first acquisition means comprising at least a first sensor operating in a first frequency band and a second acquisition means comprising at least a second sensor operating in a second frequency band different from the first frequency band;
    means for processing raw data originating from the first and second acquisition means and comprising means for detecting events in the raw data and for determining a geographic location of said events;
    means for transmitting an alert if an event is detected by the processing means;
    means for storing the raw data, said storage means configured to restore the stored raw data in a synchronized manner; and
    monitoring means which, following the detection of an event in the raw data of one of said acquisition means, enable said processing means to be parameterized to perform a new analysis of said stored raw data originating from said other acquisition means.

2. The multi-sensor device for detecting events of claim 1, wherein said processing means further comprise improved detection means adapted to increase a number of buffer memory zones for temporary storage of samples of said stored raw data.

3. The multi-sensor device for detecting events of claim 1, wherein said monitoring means are adapted, based on the detection of an event in the raw data of one of said acquisition means during a time interval, to parameterize said processing means for the use of said stored raw data originating from said other acquisition means during said time interval.

4. The multi-sensor device for detecting events of claim 1, further comprising means for determining an orientation of said device, said orientation being transmitted to the processing means.

5. The multi-sensor device for detecting events of claim 1, further comprising means for determining a time reference common to the first and second acquisition means.

6. The multi-sensor device for detecting events of claim 1, wherein the processing means further comprise means for correlating the raw data originating from the first and second acquisition means.

7. The multi-sensor device for detecting events of claim 1, wherein the sensor of one of the two acquisition means is a camera.

8. The multi-sensor device for detecting events of claim 1, wherein the sensor of one of the two acquisition means is a seismic detector.

9. The multi-sensor device for detecting events of claim 1, wherein one of the two acquisition means is a network comprising a plurality of sensors configured for a direction-finding detection.

10. The multi-sensor device for detecting events of claim 9, wherein the plurality of sensors configured for a direction-finding detection are microphones.

11. The multi-sensor device for detecting events of claim 9, wherein the plurality of sensors configured for a direction-finding detection are antennas.

12. The multi-sensor device for detecting events of claim 1, further comprising means to activate and de-activate the first and second acquisition means, said acquisition means are activated if an event is detected.

* * * * *